United States Patent [19]
Kane

[11] 3,907,250
[45] Sept. 23, 1975

[54] SLUICE GATE
[76] Inventor: John J. Kane, 2824 Bement St., Erie, Pa. 16506
[22] Filed: Aug. 2, 1973
[21] Appl. No.: 384,912

[52] U.S. Cl. ............... 251/147; 251/158; 251/187; 251/193; 49/210; 49/395; 92/138
[51] Int. Cl.² ......................................... F16K 51/00
[58] Field of Search .......... 251/158, 175, 187, 193, 251/147; 92/138; 49/210, 395

[56] References Cited
UNITED STATES PATENTS

| | | | |
|---|---|---|---|
| 1,000,784 | 8/1911 | Cumming | 92/138 X |
| 1,281,490 | 10/1918 | Billado | 92/138 X |
| 1,475,731 | 11/1923 | Windett | 251/158 |
| 2,313,095 | 3/1943 | Schneider | 49/210 |
| 2,858,096 | 10/1958 | Warren | 251/175 X |
| 3,237,915 | 3/1966 | Palmer | 251/158 |
| 3,436,861 | 4/1969 | Koch | 49/395 X |
| 3,480,186 | 11/1969 | Grosko | 251/175 X |
| 3,628,426 | 12/1971 | Frach | 92/138 |

*Primary Examiner*—Harold W. Weakley

[57] ABSTRACT

The disclosure herein shows a means for controlled forces acting to provide one hundred percent horizontal motion on a sluice gate to move a seal or sealing surface on the sluice gate to and from contact or sealing position with a frame, and to provide pressure to maintain sealing and to maintain a seal in a "no contact" position during hoisting or lowering of the gate. A lock means is provided for top and bottom of the gate and is positioned in accord with the "no contact" travel position.

5 Claims, 11 Drawing Figures

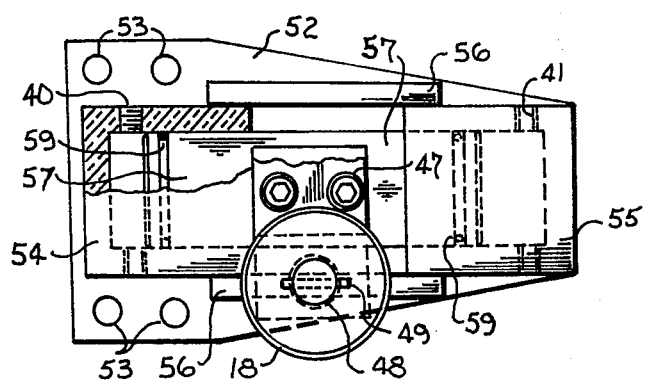
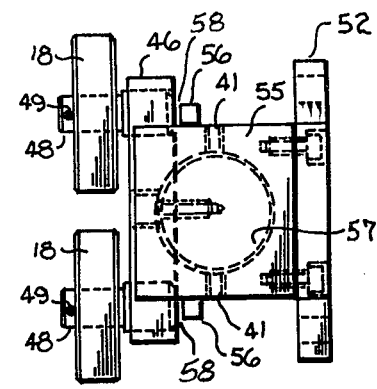
FIG. 9  FIG. 10
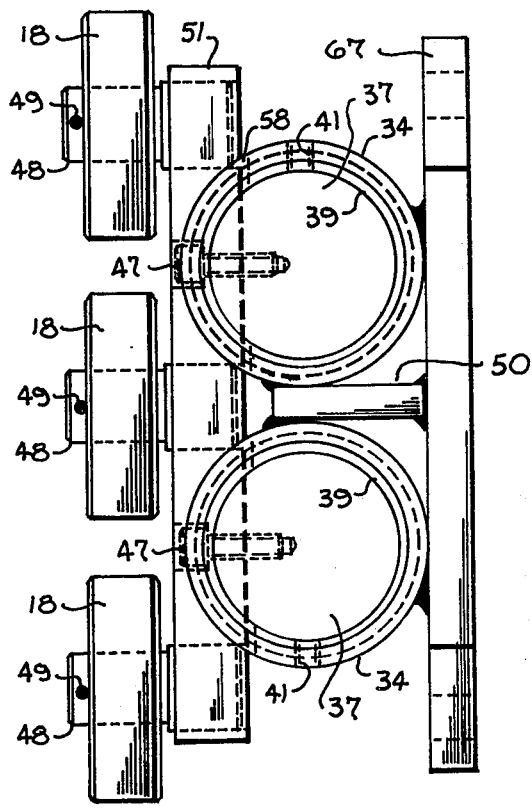
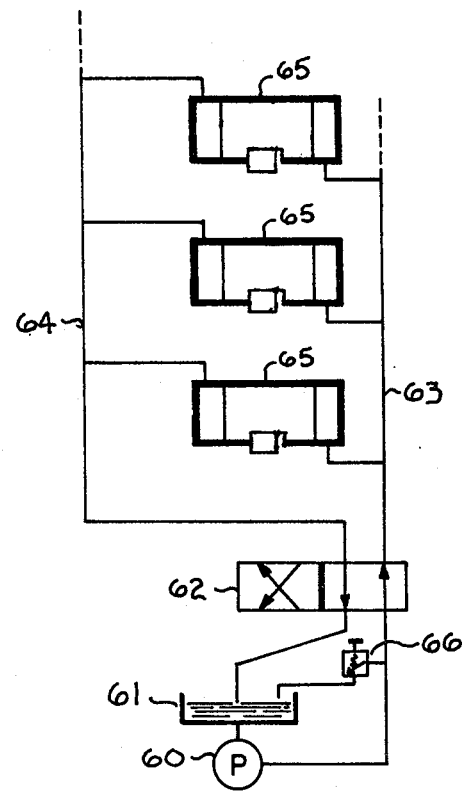
FIG. 8  FIG. 11

3,907,250

SLUICE GATE

FIELD OF INVENTION

This invention relates to gate type closures used to seal defined openings. The closure disclosed in this application is a fluid control gate or valve known as a sluice gate.

GENERAL STATEMENT OF INVENTION

Sluice gates employ sealing devices to prevent leakage at the closure. Seals may be metal to metal, or flexible gasket (neoprene) to metal. Sealing may be effected by sliding one member over the other or one part may be moved toward the other, to make contact, then pressed together. Water pressure on the gate and force to seal or lock create high friction loading on sliding seal surfaces and resulting wear allows leakage. Escaping water under pressure causes rapid erosion of seals.

This disclosure shows use of a simple hydraulic actuator to provide pressure and motion to eliminate seal surface sliding contact and seal roll, normal with cam, roller type actions. Elimination of reaction forces through wedge action or external operating linkage is accomplished by the hydraulic operated actuator.

OBJECTS OF THE INVENTION

It is an object of the invention to provide a hydraulic operated actuator which can be secured to the gate member, yet is so designed that one part of said actuator can be confined within a fixed guide member to counter reaction forces used to impart motion and pressure to the other when actuator is subjected to hydraulic pressure and flow.

By mounting the actuator perpendicular to the gate and seal surface, a horizontal movement will bring seal to contact and maintain balanced pressure for sealing without slide or roll action. Retraction is made in like manner.

Another object of the invention is to utilize the combination of actuator and a hook type member to effectively apply both sealing pressure and retraction pressure at top or bottom of wide gates where deflection and sealing can be a problem.

Still another object is to provide a sluice gate which can operate and hold a seal contact, regardless of water pressure direction to the gate. Use of multiple small single actuators, or tandem type actuators, variations in size, and by pressure within the small hydraulic systems, will allow unlimited designs to meet the most difficult gate loading requirements.

A further object is to reduce the load requirement of so-called hoisting equipment for sluice gates. Elimination of force required to close and open seal surfaces by wedge action or by mechanical actions, results in hoisting equipment sized to lift only the gate member.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 8 is a side view of a tandem hydraulic actuator.

FIG. 9 is a front view of the closed end type actuator constituting another embodiment of the invention.

FIG. 10 is a side view of a closed end actuator shown in FIG. 9.

FIG. 11 is a hydraulic schematic drawing to show typical connection to multiple actuators.

DETAILED DESCRIPTION OF THE DRAWINGS

Figure 1:
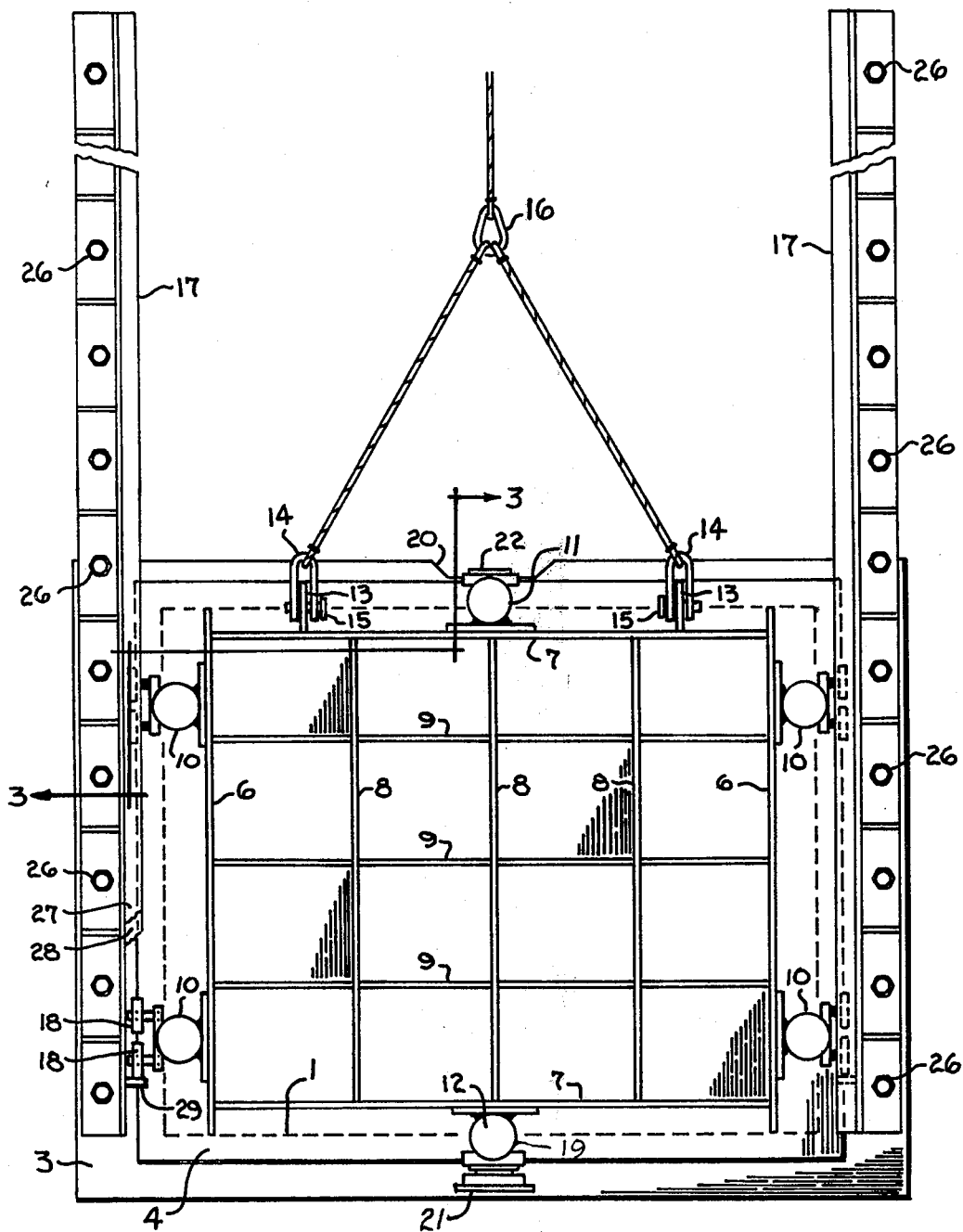
FIG. 1 is a front elevation showing typical installation and construction of the hydraulic actuator operated sluice gate.
Figure 2:
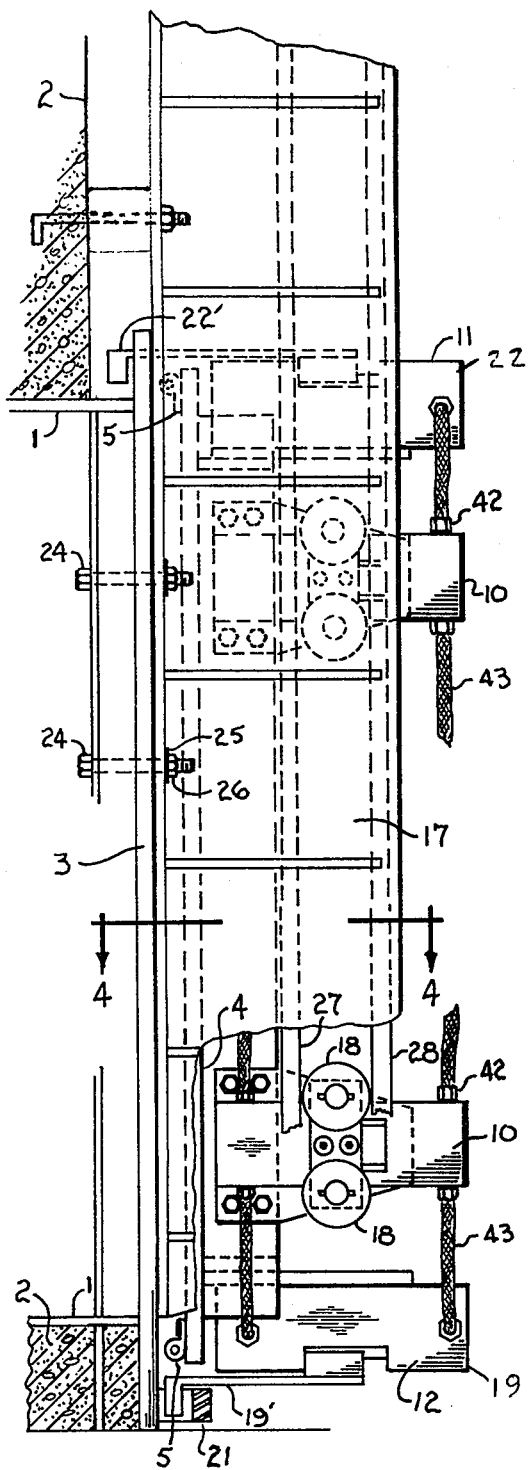
FIG. 2 shows a side elevation partly in cross section of the sluice gate in travel position and working location prior to sealing.

Now with more particular reference to the drawings, in FIGS. 1 and 2, the disclosed sluice gate shows the opening 1 in wall 2 and opening frame 3 with provisions for top and bottom latching. Frame 3 acts as the sealing surface 3A facing in a downstream direction perpendicular to the horizontal axis of the opening to be engaged by seal 5, mounted on gate 4 which extends beyond opening 1. Gate 4 has stiffener ribs 6, 7, 8 and 9 welded to it. Ribs 6 are used for mounting actuators 10. Ribs 7 are used to mount actuators 11 and 12. Lugs 13 are provided at the top of gate 4 for hoisting loops 14 which receive pins 15. Loops 16 are shown for attaching to a cable type hoisting means, however, conventional hoisting equipment such as floor stands or hydraulic cylinders used with stems attached to gate 4 could also be used. Actuators 11 and 12 are made up of cylinders having a piston therein like actuator 10 but without rollers.

It will be noted from FIG. 2 that actuator 22 is on the left side of a vertical line defined by frame 3 and actuator 19 is on the right side of that line. This makes it possible for clamp arm 19' to freely pass in front of frame 3 as the gate closes. Clamp arm 22' of actuator 22 is disposed on the left side of a vertical line defined by frame 3 in FIG. 2 and clamp arm 19' is on the right side of the same line.

Guide retainer frame 17 is secured to frame 3 and wall 2 with bolts 24, washers 25 and nuts 26. The retainer frame 17 extends outward from frame 3 and upward to a desired height above the opening 1 to guide the gate unit through hoisting operation. Spaced reaction guide bars 27 and 28 extend out on guide retainer frame 17 which receive rollers 18 between them and confine guide and take reaction forces from rollers 18 on actuators 10. A stop member 29 is provided between guide bars 27 and 28 at the bottom to contact rollers when gate is lowered to working position.

Figure 3:
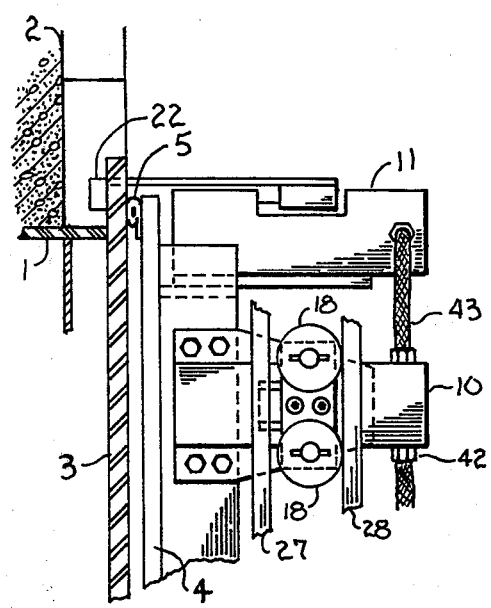
FIG. 3 shows a section of the side elevation taken on line 3—3 of FIG. 1 to show the sealed position.

With particular reference to FIG. 2, extension retainer 21 is attached to frame 3 to receive clamp arm 19' on actuator 12. The clamp arm 22' on actuator 11 on top side is confined within the structure of frame 3. Frame structure and retainer 21 are used to confine clamp arms 19' and 22' and to take reaction forces exerted from actuator operation. FIG. 3 shows the sealed position and lock provision for clamp arm 22'. Clamp arm 19' reacts in like manner with retainer 21.

FIG. 3 shows seal 5 mounted to gate member 4, however, seal 5 can also be mounted to frame 3, whereas gate member 4 becomes the sealing surface.

Figure 5:
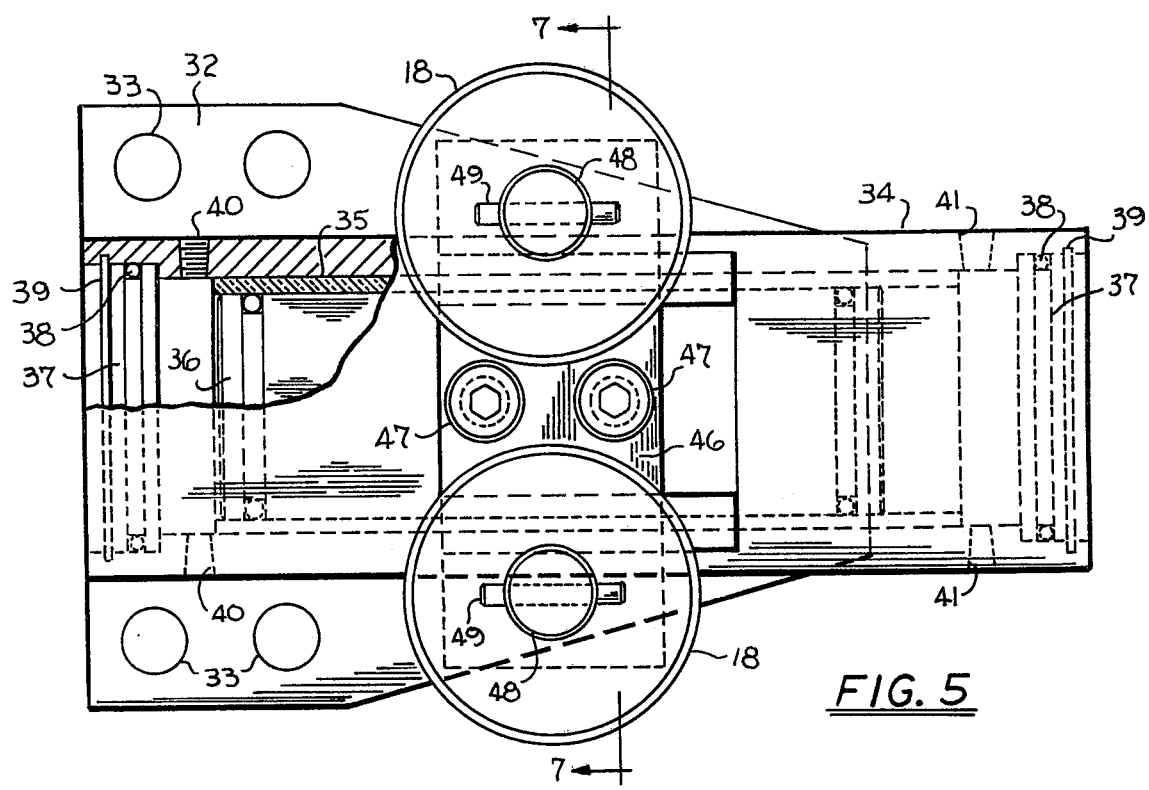
FIG. 5 is an enlarged front view of the single hydraulic actuator shown in FIGS. 3 and 4.

FIG. 5 shows a front view of a single type actuator constructed from mounting plate 32 with provision 33 for bolting to gate member ribs 6. A cylinder 34 is attached to plate 32. Piston 36 is confined within cylinder 34 and by sleeve bearings 35. Cylinder ends are sealed by closure plate 37, seal 38 and retaining ring 39. Any conventional sealing method is acceptable. Cylinder 34 has openings 40 and 41 for hydraulic line connections.

Figure 6:
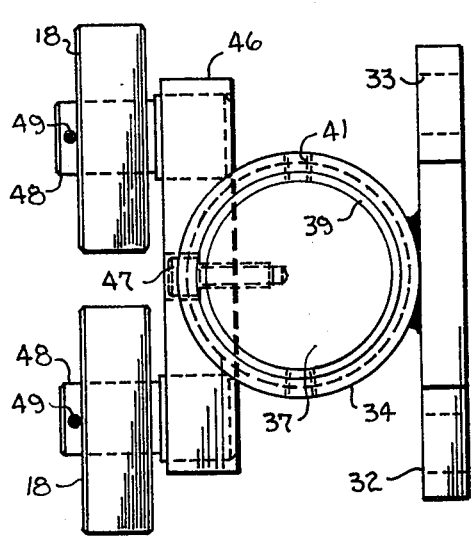
FIG. 6 is an enlarged side view of the actuator shown in FIGS. 3, 4 and 5.
Figure 7:
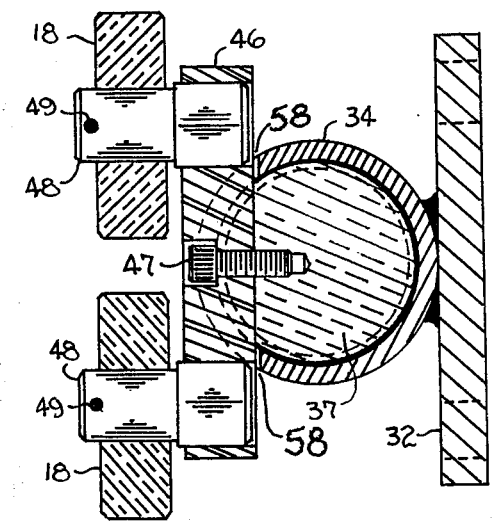
FIG. 7 is a sectional view through the actuator taken on line 7—7 of FIG. 5.

Side view FIG. 6 and section view FIG. 7 show the controlled depth and width of a cut out section of cylinder 34 wall, to expose piston 37. Extension bar 46 is secured to piston 37 by screws 47. Extending bar 46 out beyond cylinder diameter allows space for mounting shafts 48 to bars 46 at the sides of cylinders 34 with rollers 18 and retaining pins 49 attached to the bars 46. Extended length of bar 46 in combination with cylinder wall cutout provides anti-rotational action for piston 37. This is pointed out by clearance identification number 66.

Rollers 18 used in lieu of slide members are of a proper size to operate between guide bars 27 and 28 of retainer 17. Thus piston becomes the so-called fixed member of the actuator, and acts to counteract forces exerted from hydraulic pressure applied to either end of the cylinder.

FIGS. 9 and 10 show construction of a single, closed end type actuator wherein mounting plate 52 with bolting holes 53 serve to support closed end cylinders 54 and 55, spaced to expose piston 57 with seals 59. Extension bar 46, screws 47, rollers 18, shafts 48 and pins 49 are like those previously described in the other embodiments. The index numbers to this embodiment have one hundred added to the corresponding index numbers. Anti-rotational bars 56 are secured to cylinder ends 54 and 55 with clearance provision 58. Hydraulic fluid line connections are indicated as 40 and 41.

The cylinder 34 is provided with a hole in its sides defined by surfaces at the sides that are disposed in a plane perpendicular to the longitudinal axis of the cylinder 34 and ends that are disposed in planes perpendicular to the longitudinal axis of the cylinder. The ends of the hole form limit stops for the bar 46. The piston 37 is flattened in a plane generally co-planar with the plane defining the surfaces of the sides of the cylinder so that the bar 46 has clearance provision at 58.

FIG. 8 shows a side view of the tandem type actuator showing the mounting plate 67 with spacer 50 and cylinders 34. Extending of the extension bar 51 allows connecting piston 37 of each cylinder 34. Three roller units are provided.

Actuators 11 and 12 shown in FIGS. 1 and 2 for top and bottom locations follow similar construction. Clamp arms 19' and 22' are attached to the pistons, providing anti-rotational feature and extending inward to align with provision for locking to frame 3 and attachment 21.

Using the described actuators supplied in number, type and location to suit the particular gate operating and installation conditions, secured to the gate closure with side mounted actuators having piston, roller assembly entered in the guide retainers, and gate being held by suitable hoisting means, the closure unit is ready for travel to operating location.

Using conventional fluid supply system, FIG. 11, consisting of a pump 60, reservoir 61, four way directional valve 62, pressure control valve 66, combined with flexible and fixed piping 63, 64, 42 and 43 connected to actuators 65, fluid flow and pressure can be directed to either end of actuators.

By maintaining a slight pressure on the fluid system, a force is exerted on the closed end of each actuator cylinder, as piston is confined, the cylinder unit with gate will move to establish position for travel or to move from travel to sealing position.

Figure 4:
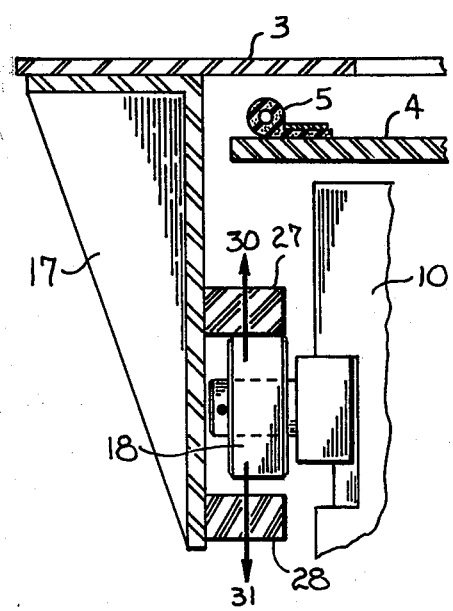
FIG. 4 is a sectional view showing the guide retainer taken on line 4—4 of FIG. 2.

FIG. 4 shows how the piston is confined and reacted on by forces 30 and 31.

To insure positive travel position and alignment for top and bottom clamp means, fluid pressure is introduced to actuators at points 41 through lines 43 thus pressure on closed ends of cylinders move actuator and gate to establish contact of cylinder wall cutout and extension bar on the piston. FIGS. 2 and 4 show travel position with established location for gate where seal is free from any contact.

With closure gate unit lowered to operating position, FIGS. 1 and 2, reversal of fluid flow and pressure by use of directional valve, fluid enters actuator at points 40. Fluid flow and pressure on closed end of cylinders establishes motion. Displaced fluid from opposite end leaves through lines 43. Motion is in horizontal direction and seal contact is made and sealing pressure can be applied as required by variation of fluid pressure entering actuator.

Reaction forces through fixed piston assembly to retainer guide are shown by directional arrows 30 and 31 of FIG. 4.

Top and bottom clamp arms 22' and 19' of actuators 11 and 12 being connected to pistons move to establish contact and holding on frame 3 and retainer 21. With piston retained, fluid pressure within cylinder moves gate and seal and establishes a seal pressure balanced with that of side mounted actuators.

By maintaining fluid pressure to actuators, so-called "downstream" water loads can be resisted and sealing can be maintained.

To unseat the seal and gate assembly, reversal of fluid pressure to opposite end of actuator reverses the identical motion for sealing and retraction to travel is a horizontal motion. Clamp arms 22' and 19' react with a push motion from contact with frame 3 and retainer 21.

Maintaining slight fluid pressure within actuators at travel operation also eliminates chatter effect from water flow.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A closure comprising a frame and a gate, said frame defining an opening, said frame having vertically extending flat surface facing toward said gate, first reaction means on said frame, said first reaction means comprising two vertically extending channel track members channel shaped in cross section, spaced outwardly from said flat surface and the legs of one said channel extending toward the other said channel defining a space between said track members at each side of said opening, said channel track members extending upwardly above said opening a distance substantially equal to the height of said opening, to receive said gate in open position, sealing means on said gate adapted to cooperate with said flat surface on said frame to form a seal, spaced actuators attached to each side of said gate, each said actuator comprising a hydraulic cylinder fixed to said gate and a piston reciprocatably received in each said cylinder, each said cylinder having an opening in a side thereof exposing a portion of said piston, second reaction means comprising bar means extending through the said opening in each said cylinder and fixed to said piston, and a roller fixed to each of said bar means disposed between said legs of each said channel track, each said piston being confined in a said cylinder allowing said cylinder and said gate to move a predetermined distance toward and away from said flat surface as said piston reciprocates in said cylinder, hydraulic fluid pressure means connected to said cylinder for moving said piston in said cylinder.

2. The closure recited in claim 1 wherein two said cylinders are fixed to each side of said gate, each said cylinder has roller means received in one of said channels.

3. The closure recited in claim 1 wherein a roller is fixed to each end of each of said bar means.

4. The closure recited in claim 3 wherein each said cylinder has a second cylinder disposed alongside it and, each said cylinder has a said piston therein and, a hole in the side of each said cylinder, said bar means, each being fixed to a side of two adjacent said pistons, one said roller being disposed on each end of the said bar means.

5. The closure recited in claim 1 wherein each said actuator comprises three said cylinders disposed adjacent each other and each said cylinder has a piston therein and, each said cylinder has a bar and a hole in the end of said bar being fixed to the piston in each said cylinder and, a roller disposed on each end of said bar.

* * * * *